(12) United States Patent
Burkett (10) Patent No.: US 7,427,237 B2
(45) Date of Patent: Sep. 23, 2008

(54) LOAD SHARING COMPOSITE SHAFT

(76) Inventor: Jerald S. Burkett, 8115 Calland Rd., West Liberty, OH (US) 43357

(*) Notice: Subject to any disclaimer, the term of this patent is extended or adjusted under 35 U.S.C. 154(b) by 0 days.

(21) Appl. No.: 10/038,946

(22) Filed: Jan. 3, 2002

(65) Prior Publication Data
US 2003/0125117 A1    Jul. 3, 2003

(51) Int. Cl.
*F16C 3/02* (2006.01)
(52) U.S. Cl. .................. 464/181; 464/183
(58) Field of Classification Search .......... 464/181, 464/183; 138/DIG. 2; 285/222.1, 239
See application file for complete search history.

(56) References Cited

U.S. PATENT DOCUMENTS

| | | | |
|---|---|---|---|
| 2,848,133 A * | 8/1958 | Ramberg | 138/DIG. 2 |
| 3,366,522 A * | 1/1968 | Underwood | 138/DIG. 2 |
| 3,553,978 A | 1/1971 | Williams | |
| 3,592,884 A | 7/1971 | Williams | |
| 3,850,722 A * | 11/1974 | Kreft | |
| 4,185,472 A * | 1/1980 | Yates et al. | 464/181 |
| 4,238,539 A | 12/1980 | Yates et al. | |
| 4,272,971 A | 6/1981 | Loyd et al. | |
| 4,421,497 A | 12/1983 | Federmann et al. | |
| 4,569,667 A * | 2/1986 | Hannibal et al. | |
| 4,681,556 A * | 7/1987 | Palmer | 464/181 |
| 4,863,416 A * | 9/1989 | Gupta | 464/181 |
| 4,963,210 A * | 10/1990 | Corr et al. | 464/181 X |
| 5,127,975 A | 7/1992 | Zackrisson et al. | |
| 5,261,991 A | 11/1993 | Zackrisson et al. | |
| 5,309,620 A | 5/1994 | Shinohara et al. | |
| 5,322,580 A | 6/1994 | McIntire et al. | |
| 5,342,464 A | 8/1994 | McIntire et al. | |
| 5,551,918 A * | 9/1996 | Jones et al. | |
| 5,683,300 A | 11/1997 | Yasui et al. | |

OTHER PUBLICATIONS

SAE Universal Joint and Driveshaft Design Manual, AE-7, Society of Automotive Engineers, Inc., Warrendale PA, pp. 177, 267-271, 393 and 394, TJ1079.S62 1979.*

* cited by examiner

*Primary Examiner*—Greg Binda (57) ABSTRACT

A composite shaft for transmitting torsional forces between end pieces of the shaft. The shaft includes an inner tube member with an end piece mounted at each end of the tube. A composite material is provided covering the inner tube member and at least a portion of the end pieces. The composite material includes elongated fibers oriented at a predetermined angle which optimizes the strength of the shaft for a desired shaft performance, and the shaft is constructed to provide multiple load paths between the end pieces.

17 Claims, 6 Drawing Sheets

FIG. 5

LOAD SHARING COMPOSITE SHAFT

BACKGROUND OF THE INVENTION

This invention relates to a cylindrical composite shaft which includes end pieces to transmit torsional forces. Currently it is well known that open ended, generally cylindrically shaped tubes formed of composite materials, such as materials comprising graphite, boron, aramid, glass fibers and epoxy, polyester and/or vinylester matrix, have extremely high strength to weight ratios. Also, depending on composite material selection, these tubes are capable of high stiffness to weight ratios and are consequently replacing metal tubes for the transmission of tensile, compression, bending and/or torsional loads. Some common applications of composite material tubular shafts are rollers in paper mills, bicycle frames, driveshafts, and golf club shafts. Composite driveshafts also have another well-known advantage over all-metal shaft constructions by providing a major reduction in noise, vibration, and harmonics. All composite materials have natural dampening characteristics. Perturbations due to the exterior environment or connections (drivetrain, etc.) are absorbed by the composite material, instead of transferring the perturbations to the next component of the vehicle. However, widespread use of composite material shafts for has been extremely limited as a result of structural and economic limitations associated with the design and construction of the shafts.

Structural limitations of common practice occurs when highly loaded shaft applications are necessary. It is well known in the art of composite shaft construction to bond metal end pieces into the open ends of the tubular shaft, formed by a composite tube, to transmit forces into the tube from the adjacent mechanism or structure, this defines a composite shaft which is a composite tube plus end pieces. Successful load transfer from the metallic end pieces to the composite tube usually relies on a single load path, which is defined by the bonding material adhesive between the end piece and composite tube surfaces. While this practice is accepted in the aerospace industry, it creates many doubts by potential customers outside of aerospace, especially in the area of high load applications such as driveshafts. From a structural standpoint, these composite shafts are totally dependent upon the quality and inherent characteristics of the bonding process, as well as being subject to potential human error which may be introduced during assembly and bonding of the end pieces to the composite tube.

Economic limitations associated with common practice for constructing composite shafts generally result from the high labor content of the manufacturing processes, and in particular the high labor content associated with construction of the composite tube construction, and the high labor content associated with the insertion and bonding process for attaching the metallic end pieces into the composite tube.

With regard to the cost associated with constructing the composite tube, it is typical or common practice during the manufacturing process of composite tubes to utilize a reusable metal tool. This metal tool is typically a high-grade steel which requires a high level surface finish resulting in a fairly expensive tool. Uncured wet composite material (fiber plus resin matrix) is wrapped, pultruded or wound on the metal tool outside diameter after which the composite material is cured at a predetermined temperature for an established period time, whereby the composite tube is formed with a final shape corresponding to the shape of the metal tool. Finally, the metal tool is pressed, i.e., extracted, from the composite tube inside diameter. This reusable metal tool is then cleaned and prepared, including for example application of a release agent, between each composite tube fabrication cycle. This tool cleaning and preparation portion of the manufacturing process requires considerable time and attention to detail which ultimately adds substantial cost to the final part. In addition, it is also common practice to include a machining step in preparation for receiving the end pieces wherein the open ends of the cured composite tube are faced off.

With regard to the cost associated with insertion and bonding of the end pieces into the composite tube ends, the operations associated with this process are considered critical to the proper performance of the final product and therefore requires substantial time and attention to detail. In particular, this process is responsible for the performance of the entire shaft structure, in that the bonding material provides a single load path between end pieces and the composite tube. Quality concerns and repeatability of this process is of the utmost importance. Failure to follow any part of this critical process may result in catastrophic part failure as a result of the end piece debonding from the composite tube. Typical in the art of this process is the critical preparation of the end piece surface and composite tube surface. The surfaces which create the bond layer interface must be extremely clean and free of all oil and other contaminants. If this does not happen, the bonding agent will not adhere to the surfaces substrate resulting in an adherend failure. Consequently, human error plays a large roll in any failures resulting from defects in the bonding process. Obviously, due to the criticality of this process, strict manufacturing process and quality procedures must be followed (typical of aerospace industry), which results in high labor content. Obviously this process, while adequate for certain lightly loaded high cost applications does not lend itself to high volume production.

One approach that has been attempted to eliminate constructions requiring a tool extraction step is the use of plastic foam core material over which the composite material is wrapped. This foam core remains part of the cured shaft and of course is cylindrical in shape. However, great difficulties arise in the manufacturing process due to the low mechanical properties of the foam core itself. Alignment of end pieces and adequate strength and stiffness required for the manufacturing process limits the success of this approach, especially for long narrow shafts with high length to diameter ratios.

Clearly, in order to fully utilize the superior mechanical properties, including a high strength-to-weight ratio of composite material tubes and move composite shafts from very limited use, such as in high cost/low load applications, to the mass produced widespread applications, an improved design and process for manufacturing composite shafts is needed to address structural issues and to reduce manufacturing cost.

SUMMARY OF THE INVENTION

The present invention provides a composite shaft construction which provides for improved structural strength and improved cost of construction. In particular, an improved design and manufacture for a composite shaft is provided including an inner tube member for the shaft, at least one end piece located adjacent at least one end of the inner member and a composite material covering the inner tube member and at least a portion of the end piece wherein the portion of the end piece covered with the composite material defines a convexly curved area of the end piece.

In the preferred embodiment, an end piece is provided at either end of the shaft, and specified torsional loads are transferred from the end pieces effectively into the composite tube. Additionally, the inner tube typically is a thin metal tube of sufficient rigidity to act as a forming mandrel for the composite material and to hold the end pieces in alignment relative to each other during manufacture of the composite shaft structure. In contrast to prior art composite structures which rely totally on a single load path from the end piece surface through a bonding material, or adhesive, and then to the composite tube surface, the shaft structure of the present invention provides multiple mechanical load paths to transfer loads effectively from the end pieces to the composite cylindrical section.

Torsional loads from the end pieces are all mechanically transferred into the composite material cross section by a knurled surface finish of the end piece itself. This surface is approximately 0.015 inch deep and 0.015 inch high so that during the manufacturing process the wet (uncured) fiber/matrix composite material sinks into the deep grooves of the knurled surface. Ultimately, when the composite material is dry (cured) the hardened composite is locked onto the end pieces and all loads applied to the end pieces are consequently directly transmitted into the composite material.

In addition to this load path, two other backup or secondary load paths are utilized. One path is from the end piece to the thin metal tube by a friction fit and/or an adhesive layer used to attach the end pieces to the thin metal tube for the winding assembly process. The second path is from the thin metal tube to the composite material via an adhesion layer between the entire metal tube exterior surface and the composite material. This adhesive layer between the metal tube and the composite material is not a secondary operation, but rather utilizes (wet) resin from the composite manufacturing overwrap operation to bond the composite material directly to the metal tube forming a single (hybrid) load carrying structure.

This invention's structural advantages result in a shaft with greatly increased load transfer ability of the end pieces to the composite material whereby the durability, reliability and overall load carrying capability of the composite shaft is increased.

DETAILED DESCRIPTION OF THE PREFERRED EMBODIMENT

Figure 1:
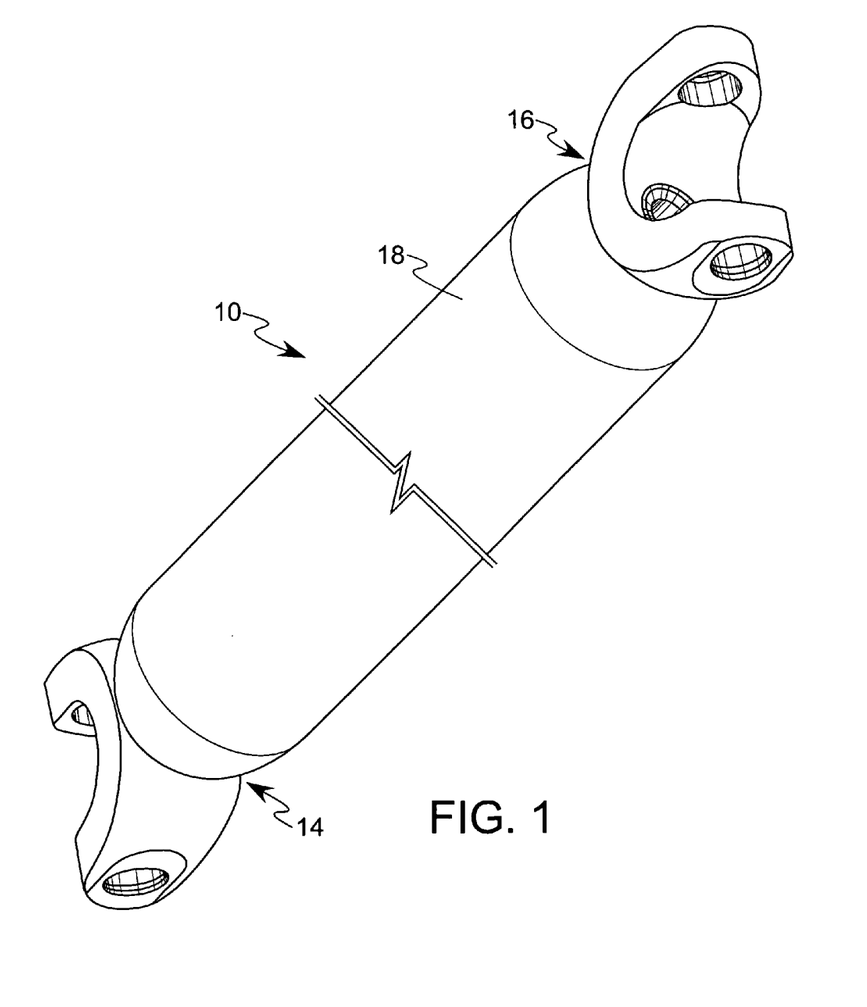
FIG. 1 shows a composite shaft constructed in accordance with the present invention.
Figure 2:
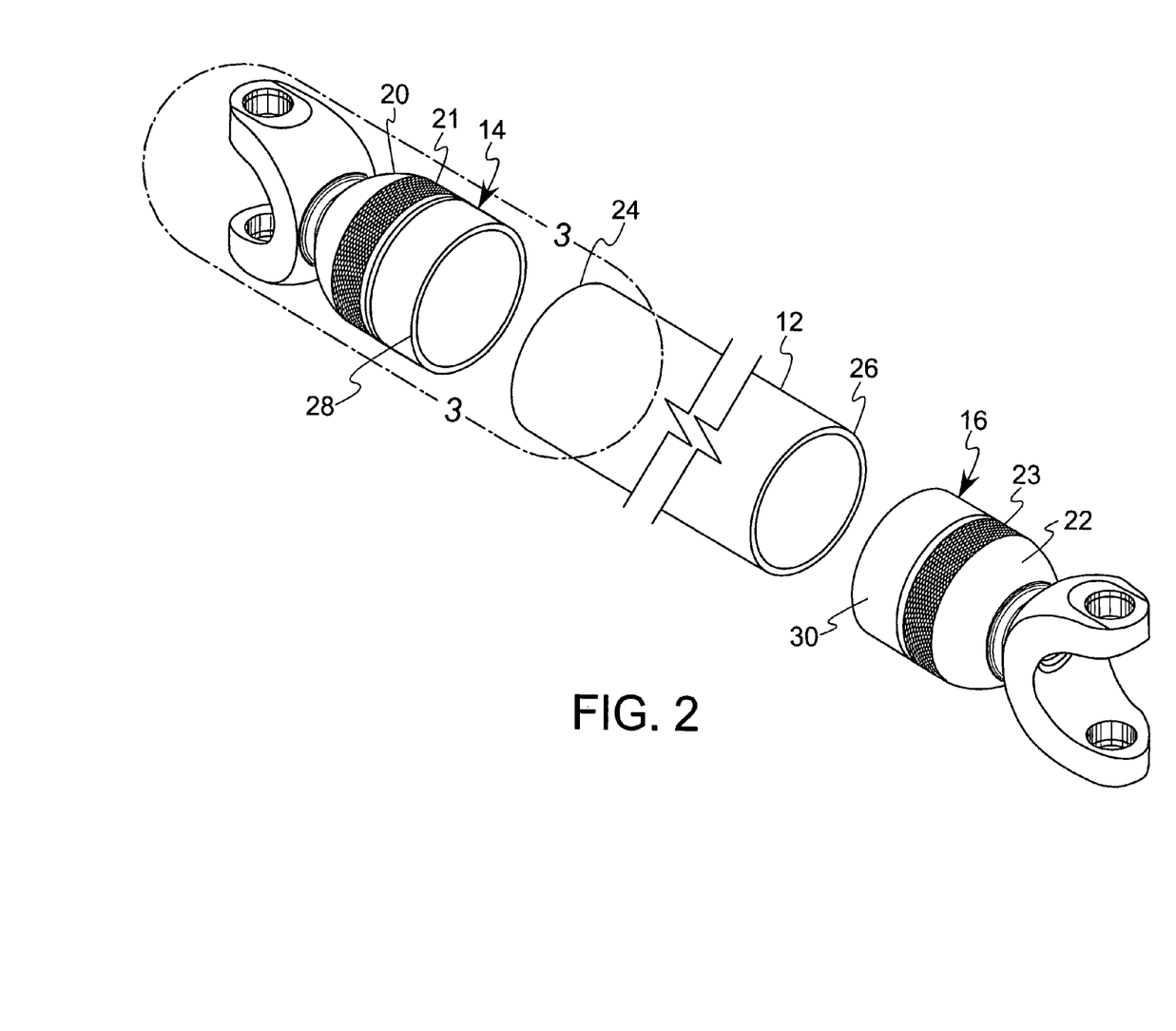
FIG. 2 shows an exploded view of the components forming the composite shaft of the present invention.
Figure 3:
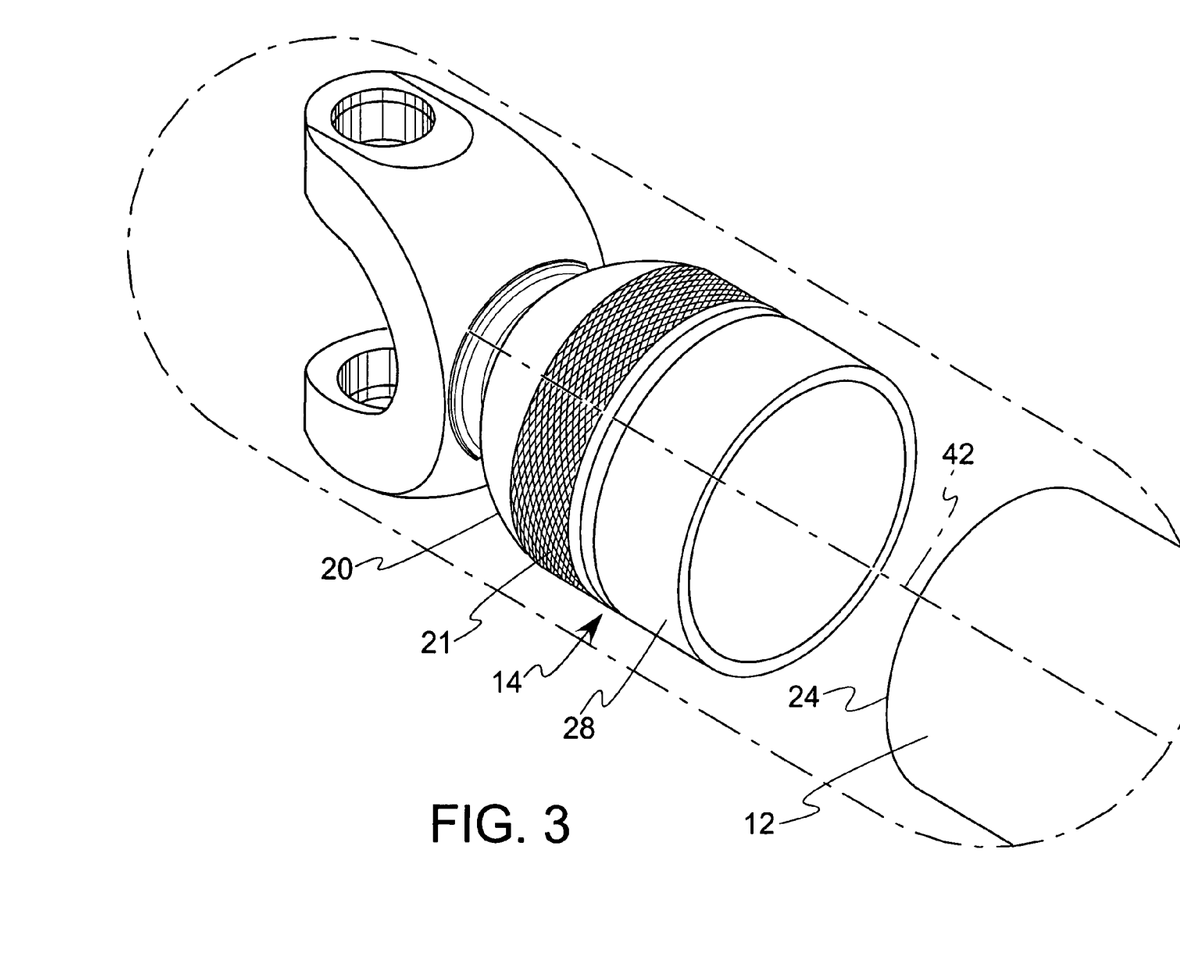
FIG. 3 shows a detail view of one end of the view of FIG. 2 taken along line 3—3 of FIG. 2.

Referring to FIGS. 1–3, the composite shaft 10 of the present invention is illustrated and, as is described further below, is particularly designed for use in high speed, high torque applications, such as in use as a vehicle drive shaft.

The shaft 10 comprises an inner tube member 12, a pair of end pieces 14, 16 located at either end of the inner tube member 12, and a composite material overwrap 18 formed of resin and fibers covering the inner tube member 12 and a portion 20, 22 of each of the end pieces 14, 16, respectively. The inner tube preferably comprises a thin metal tube and defines opposing open ends 24, 26. Further, each portion 20, 22 of the end pieces 14, 16 includes a knurled surface 21, 23 which is preferably 0.015 inch deep and 0.015 inch high to facilitate formation of a mechanical connection between the composite material 18 and the end pieces 14, 16.

Each of the end pieces 14, 16 preferably is formed as a turned metal component, such as on a CNC (computer numerical controlled) machine, and includes a respective interface portion 28, 30 for insertion in the open ends 24, 26 of the inner tube member 12. The interface portions 28, 30 are preferably friction fit into the ends 24, 26 of the inner tube member 12 to form a direct mechanical connection between the ends 24, 26 and the inner tube member 12. Additionally, an adhesive may be provided on the interface portions 28, 30 for forming a rigid connection between the end pieces 14, 16 and the inner tube member 12. With the end pieces 14, 16 thus connected to the inner tube member 12, the end pieces 14, 16 are properly aligned relative to each other in preparation for the operation of applying the composite material 18 to the shaft 10.

Figure 5:
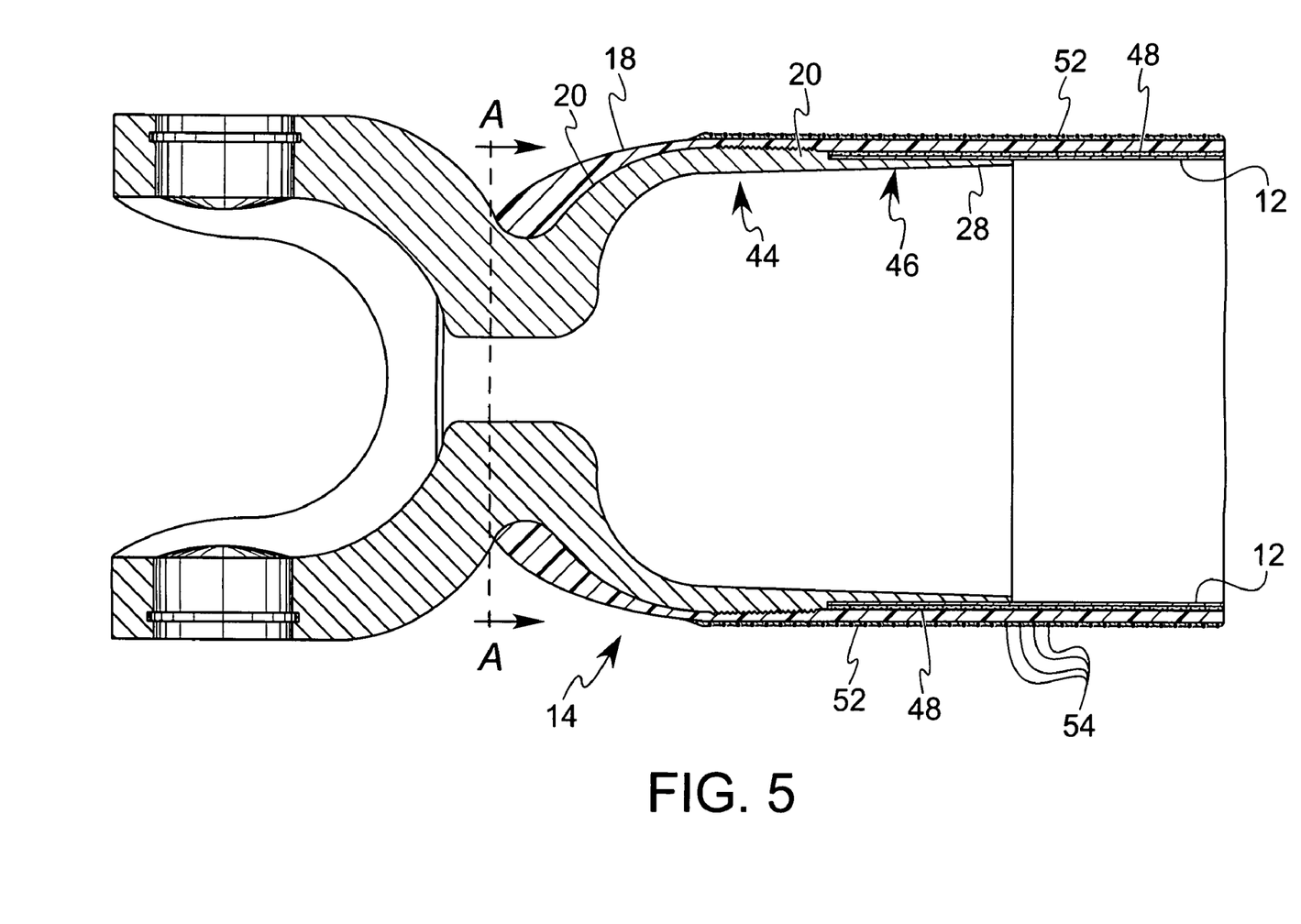
FIG. 5 is a cross-sectional view of one end of the composite shaft of FIG. 1.

Referring to FIG. 5, it can be seen that the portion 20 of the end piece 14 covered by the composite material 18 is formed with a convexly curved shape, as will be described in greater detail below, and is formed with an elliptical shape calculated based on design considerations related to the angle of elongated fibers forming the composite material relative to the longitudinal axis 42 of the shaft 10. The shape of the portion 22 of the opposing end piece 16 is also convexly curved and shaped according to the same design considerations as the portion 20 of the end piece 14.

It should also be noted that the construction of the present shaft 10, as illustrated in FIG. 5, provides improved load transfer characteristics for transferring torque loads between the opposing end pieces 14, 16. Specifically, multiple load paths are defined between the end pieces 14, 16. A first load path comprises the connection 44 between the composite material 12 and the end pieces 14, 16, which is facilitated by the knurled surfaces 21, 23 to form a rigid connection after the wet or uncured composite material is deposited within the grooves of the knurled. surfaces 21, 23 and cured, locking the hardened composite material 18 to the end pieces 14, 16. A second load path is defined by the connection 46 between the end pieces 14, 16 and the inner tube member 12, at the interface portions 28, 30. A third load path is provided from the inner tube 12 to the composite material 18 via an adhesion layer 48 between the entire exterior surface of the inner tube member and the composite material. It should be noted that the formation of these multiple paths takes place during the operation of forming the tubular composite portion 18 of the shaft, resulting in the application of the composite material to the inner tube member 12 and to the knurled portions of the end pieces 14, 16, such that a further or secondary operation is not required to create a consistent and durable hybrid structure for transfer of torque loads between the end pieces 14, 16.

As was briefly noted previously, a further characteristic of the present shaft design relates to the relationship between the elongated fibers forming the composite material 18 and the underlying structure, including the inner tube member 12 and the portions 20, 22 of the end pieces 14, 16 covered by the composite material 18. Selection of the design for the shaft 10 requires consideration of both projected performance criteria for the shaft 10 and physical design variables for the shaft 10. The performance criteria comprises consideration of the maximum rotational operating speed, maximum operating torque, and environmental factors including maximum and minimum operating temperatures and exposure to chemically detrimental substances among other factors.

The physical design variables comprise respective diameters of the composite material 18 and inner tube member 12, the total end-to-end length of the shaft 10, the material and tube thickness of the inner tube member 12, the type of material used in the formation of the composite material 18, the angle of the fibers forming the composite material 18 relative to the longitudinal axis 42 of the shaft 10, the thickness of the composite material 18, the thickness and material of the end pieces 14, 16, and the geometry of the curved portion of the end pieces 14, 16.

In order to form a design which provides an optimum solution, from a cost and structural efficiency standpoint, variables in the physical design must be selected so as to meet the performance criteria. In order to achieve this goal, five analysis constraints must be simultaneously satisfied whereby a unique design solution is provided for a given set of performance criteria. These five analysis constraints take into consideration 1) a predetermined maximum rotational operating speed, 2) a predetermined maximum operating torque, 3) a load sharing relationship between the inner tube member and the composite material, 4) a single winding angle for the fibers forming the composite material to satisfy the first three constraints, and 5) a geometric isotensoid shape for the end pieces related to the winding angle for the fibers.

1) Maximum Rotational Operating Speed

The first natural frequency, $\omega_\eta$, of the shaft 10 is described by the equation $$\omega_\eta = \frac{\eta^2 \pi^2}{L^2}\left(\frac{E_x I}{\rho A}\right) \quad (1)$$

Where $\eta$ is the natural vibrational mode, L is the shaft length, $E_x$ is the modulus of elasticity, I is the rectangular moment of inertia, $\rho$ is the mass density of the composite material, and A is the cross sectional area of the shaft.

The first natural frequency, $\omega_\eta$, must be greater than the predetermined maximum rotational operating speed in order to avoid the condition where the shaft 10 will vibrate itself to catastrophic failure. Composite materials have very low mass densities, $\rho$, and it should be noted that decreasing fiber angles, $\alpha$ (see FIG. 4) relative to the longitudinal axis 42, result increasing values for $E_x$. Therefore, from equation (1) it can be seen that fiber angles, $\alpha$, approaching 0° result in very high values for the natural frequency, $\omega_\eta$, and thus provide very high maximum rotational operating speeds.

2) Maximum Operating Torque

The maximum operating torque, $T_m$, for the shaft 10 is described by the equation $$T_m = \frac{J\tau}{c} \quad (2)$$

Where $\tau$ is the shear strength, J is the polar moment of inertia and c is the outside radius of the shaft 10. In accordance with this criteria, the maximum operating torque, $T_m$, of the shaft 10 must exceed a predetermined operating torque predicted for the shaft 10 to be subjected to during operation.

It should be noted that for fiber angles, $\alpha$, approaching 45°, the shear strength, $\tau$, will increase to a maximum, which will produce high torque values for a given cross-sectional thickness of the shaft 10.

3) Load Sharing Relationship Between the Inner Tube Member and the Composite Material In accordance with this criteria, the inner tube member 12 and the composite material 18 must be constructed so that they each fail at the same ultimate torque, $T_m$. Although, due to the structural characteristics inherent in the composite material 18, the composite material 18 will carry the primary load, as compared to the inner tube member 12, each of the composite material 18 and the inner tube member 12 must be designed to contribute its maximum potential load carrying ability, as measured by its angle of twist, $\phi$, at failure. The angle of the twist, $\phi$, is described by the equation $$\phi = \frac{TL}{JG} \quad (3)$$

Where T is the applied torque, J is the polar moment of inertia, L is the length of the component and G is the modulus of rigidity.

In order for the contribution of the load carrying characteristics of the inner tube member 12 and the composite material 18 to be maximized at failure, they must fail at the same angle of twist such that $$\phi_I = \phi_C \quad (4)$$

Where $\phi_I$ is the angle of twist of the inner tube member 12 at failure, and $\phi_C$ is the angle of twist of the composite material 18 at failure. Accordingly, the following relationship between the construction of the inner tube member 12 and the composite material 18 exists $$\frac{T_I L_I}{J_I G_I} = \frac{T_C L_C}{J_C G_C} \quad (5)$$

Where terms corresponding to the inner tube member 12 are designated with a subscript "I", and terms corresponding to the composite material 18 are designated with a subscript "C".

Further, the maximum operating torque, $T_T$, for the shaft 10 is determined by combining the torque contribution of the two components, i.e., the inner tube member 12 and the composite material 18, as described by the equation $$T_T = T_I + T_C \quad (6)$$

Where $T_I$ is the torque carried by the inner tube member 12 at failure, and $T_C$ is the torque carried by the composite material 18 at failure.

4) Single Winding Angle for Composite Material Fibers

The criteria of equation (1) is in apparent conflict with the criteria of equation (2) with regard to selection of a fiber angle, $\alpha$, in that optimum rotational operating speeds are provided as the fiber angle, $\alpha$, approaches 0°, and maximum operating torque is provided as the fiber angle, $\alpha$, approaches 45°. However, providing a shaft constructed with the composite material fibers oriented at different angles to accommodate the different requirements of equations (1) and (2) is not conducive to manufacturing efficiency, and the present invention provides a composite material construction in which a single optimum fiber angle, $\alpha$, is selected.

The single optimum fiber angle, α, is determined by simultaneously solving equations (1) through (6) and deriving a shaft design which simultaneously meets the preceding three constraints relating to the maximum rotational operating speed, the maximum operating torque, and the sharing relationship between the inner tube member and the composite material. In this manner the shaft 10 will be designed to safely operate within a desired performance envelope of a maximum speed and torque and will ensure that the characteristics of the component parts, comprising the inner tube member and the composite material, will be optimized for carrying optimal portions of the load being transferred through the shaft.

5) Geometric Isotensoid Shape for the End Pieces

Figure 4A:
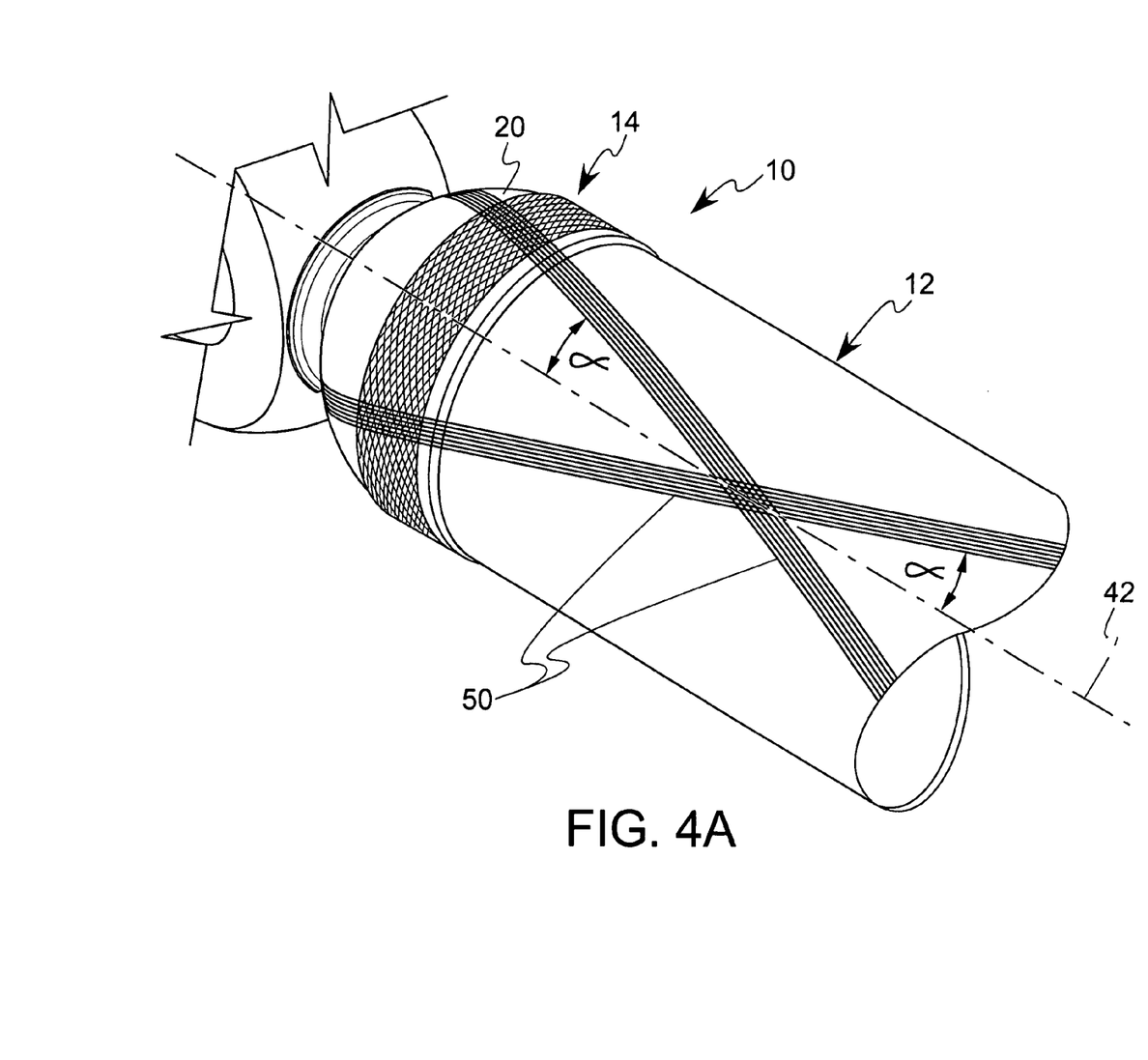
FIG. 4A shows a portion of the wrapping operation for placing the composite material on the inner tube member and end pieces.
Figure 4B:
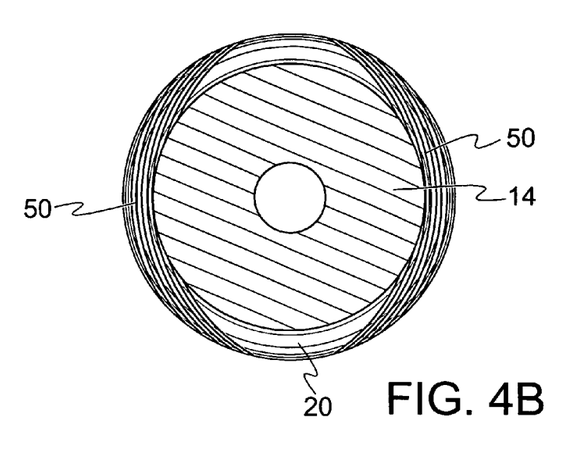
FIG. 4B is a cross-sectional view taken along cut line A—A in FIG. 5 and showing the portion of the wrapping operation of FIG. 4A.
Figure 4C:
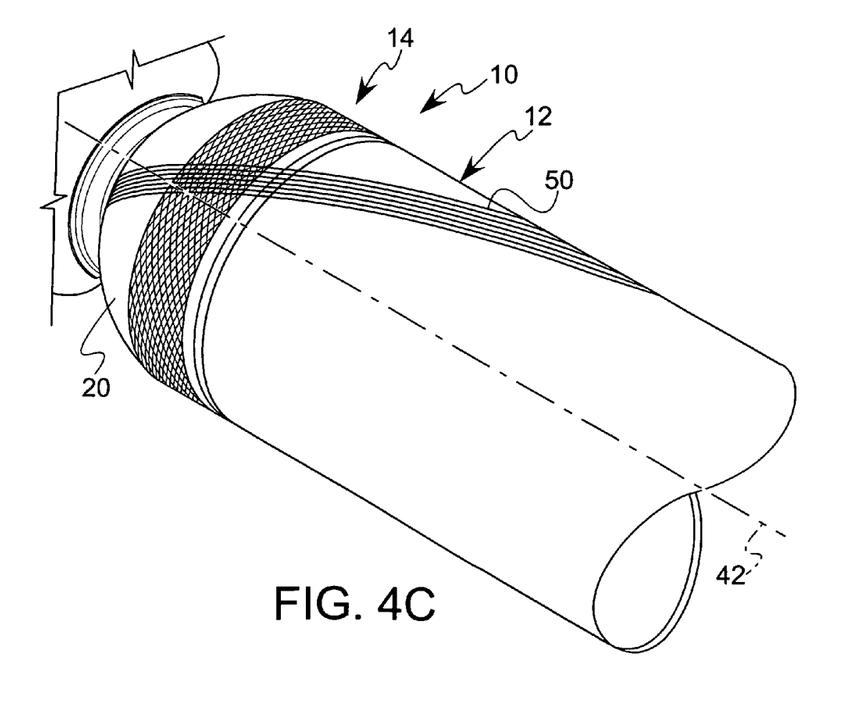
FIG. 4C is a view of the wrapping operation, similar to FIG. 4A, wherein the shaft structure is rotated 90 degrees about its longitudinal axis.

Once an optimum fiber angle, α, has been determined, a corresponding polar radius $R_P$ is determined for the curved portions 20, 22 of the end pieces 14, 16 covered by the composite material 18 in accordance with the equation $$R_P = R_T \sin \alpha \tag{7}$$

Where $R_T$ is the maximum radius the end piece 14, 16 where it meets the inner tube member 12, and α is the angle of the fibers of the composite material 18 as it is being applied to the inner tube member 12 and end pieces 14, 16, as seen in FIG. 4. It should be noted that although the filaments or fibers, designated 50, are applied at a single angle, α, alternating layers of fibers 50 are applied laying across each other with each pass of the winding operation from one end piece to the other, each pass of the fibers being oriented at the optimum angle α relative to the longitudinal axis 42.

Once the polar radius, $R_P$, is determined, a geodesic isotensoid elliptical shape is determined with reference to the polar radius, $R_P$, by application of a series of differential equations, such calculations being well known. A geodesic isotensoid is by definition a constant stress level in any given filament or fiber 50 at all points in its path. This elliptical shape in conjunction with the single optimum fiber angle ensures that the fiber 50 is stable and does not slip during the manufacturing process. This shape also assures that after the composite material is cured, shear loads are transferred efficiently through the composite material along the fiber path, i.e., in the direction of elongation of the fibers 50.

It should be noted that a resin and fiber sacrificial layer 52 may also be provided overlying the structural composite material 18. The sacrificial layer 52 comprises a thin wrap of fibers 54 oriented at approximately 90 degrees relative to the longitudinal axis which facilitates compaction of the fibers of the composite material 18 and although it does not contribute directly to the structural strength of the shaft, it provides a sacrificial outer layer which may be finished to improve the exterior surface appearance. Further, the sacrificial layer 52 acts to isolate the structural composite layer 18 from environmental hazards such as, for example, stone impacts and abrasion.

From the above description, it should be apparent that the present invention provides a unique manufacture for a composite shaft which further provides for economies in the manufacturing process. The one-piece design process described herein eliminates tool extraction and preparation processes, as well as avoids the critical end piece bonding process associated with prior construction. Additionally a tube machining operation for facing off the ends of the tube prior to installation of the end pieces is also avoided. This invention preferably utilizes end pieces turned on high speed CNC (computer numerical controlled) equipment along with an inexpensive thin metal tube to provide stability for the fabrication and curing process. While a winding assembly process is introduced, this process time is only a small fraction of the total time of the operations associated with prior processes which are common practice in the art of composite shaft fabrication. Further, the shaft is complete in the "as wound" state after a cure cycle and requires no subsequent operations, such as machining, bonding, or balancing.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A shaft for the transmission of torsional loads, the shaft comprising:
    an elongated inner tube member having opposing open ends;
    at least one end piece located adjacent at least one end of the inner tube member; at least a portion of said end piece including a knurled exterior surface,
    a composite material in contact with and covering the entire inner tube member and in contact with and covering at least a portion of the end piece; said composite material mechanically connected to said knurled exterior surface, and
    wherein the portion of the end piece covered by the composite material defines a convexly curved area of the end piece.

2. The shaft of claim 1 wherein the composite material includes elongated fibers, and the fibers are oriented at an angle which satisfies the condition that the angle of twist of the inner tube at failure equals the angle of twist of the composite material at failure.

3. The shaft of claim 1 wherein the composite material includes elongated fibers, and substantially all of the fibers are oriented at a single angle which satisfies the conditions that the shaft have a first natural frequency greater than a predetermined maximum rotational operating speed, the shaft have a maximum operating torque strength which exceeds a predetermined operating torque, and the angle of twist of the inner tube at failure equals the angle of twist of the composite material at failure.

4. The shaft of claim 1 wherein an end piece is provided at each end of the shaft, each end piece including at least a portion of a knurled exterior surface.

5. The shaft of claim 4 wherein torsional loads are transmitted from the end pieces to the composite material through multiple load paths.

6. The shaft of claim 5 wherein the multiple load paths comprise a direct connection between the end pieces and the composite material, and a connection from the end pieces to the inner tube and a connection from the inner tube to the composite material.

7. The shaft of claim 1 wherein the composite material includes elongated fibers which are oriented relative to the curvature of the portion of the end piece covered by the composite material such that, in the area of the portion of the end piece covered by the composite material, shear loads in the composite material are transferred longitudinally along the length of the fibers.

8. The shaft of claim 1 wherein the inner tube comprises a mandrel used in forming the composite material on the shaft.

9. The shaft of claim 8 wherein an end piece is provided at each end of the shaft and the inner tube provides alignment between the end pieces during formation of the shaft.

10. The shaft of claim 1 further including a sacrificial layer covering the composite material.

11. The shaft of claim 10 wherein the sacrificial layer comprises a layer thinner than the composite material, and includes fibers oriented at approximately 90 degrees relative to the elongated inner tube member.

12. A shaft for the transmission of torsional loads, the shaft comprising:
   an elongated inner tube member having opposing open ends;
   an end piece located adjacent each end of the inner tube member;
   a composite material in contact with and covering the entire inner tube member and at least a portion of each of the end pieces; said composite material mechanically attached to each of the said end pieces, and
   wherein the composite material includes elongated fibers, said elongated fibers being wound about said inner tube member and at least a portion of each of the said end pieces whereby shear loads in the composite material are transferred longitudinally along the length of said elongated fibers.

13. The shaft of claim 12 wherein substantially all of the fibers are oriented at a single angle which satisfies the conditions that the shaft have a first natural frequency greater than a predetermined maximum rotational operating speed, the shaft have a maximum operating torque strength which exceeds a predetermined operating torque, and the angle of twist of the inner tube at failure equals the angle of twist of the composite material at failure.

14. The shaft of claim 12 wherein torsional loads are transmitted from the end pieces to the composite material through multiple load paths.

15. The shaft of claim 14 wherein the multiple load paths comprise a direct connection between the end pieces and the composite material, and a connection from the end pieces to the inner tube and a connection from the inner tube to the composite material.

16. A shaft for the transmission of torsional loads, the shaft comprising:
   an elongated inner tube member having opposing open ends;
   at least one end piece located adjacent at least one end of the inner tube member, said end piece including a knurled exterior surface;
   a composite material covering the inner tube member and at least a portion of the end piece, said composite material including elongated fibers wound about the inner tube member and end piece whereby shear loads in the composite material are transferred longitudinally along the length of said elongated fibers, said composite material mechanically connected to said knurled exterior surface; and
   wherein the portion of the end piece covered by the composite material defines a convexly curved area of the end piece, said shaft being open ended at both ends.

17. The shaft of claim 16 wherein said elongated fibers are oriented at an angle which satisfies the condition that the angle of twist of the inner tube at failure equals the angle of twist of the composite material at failure.

* * * * *